Reissued

3820

Feb 1 1870

Thomas A. Edison's Impt in Electrical printing Instruments. Assigned in full to F. S. Lanz.

PATENTED NOV 9 1869

Witnesses.
W. Hauff,
R. Baumeister

Inventor.
Thomas A. Edison

THE NORRIS PETERS CO., WASHINGTON, D. C.

Thomas A. Edison's Impt in Electrical printing Instruments.

Assigned in full to L. L. Lane.

PATENTED
NOV 9 1869

Witnesses.
W. Huff
R. Langmuister

Inventor.
Thomas A. Edison

THE NORRIS PETERS CO., WASHINGTON, D. C.

UNITED STATES PATENT OFFICE.

THE GOLD AND STOCK TELEGRAPH COMPANY, OF NEW YORK, N. Y., ASSIGNEES, BY MESNE ASSIGNMENTS, OF THOMAS A. EDISON

IMPROVEMENT IN PRINTING-TELEGRAPHS.

Specification forming part of Letters Patent No. 96,567, dated November 9, 1869; Reissue No. 3,820, dated February 1, 1870.

*To all whom it may concern:*

Be it known that THOMAS A. EDISON, of the city, county, and State of New York, did invent a new and useful Improvement in Electrical Printing-Instruments; and the following is hereby declared to be a full, clear, and exact description thereof.

Figure 1:
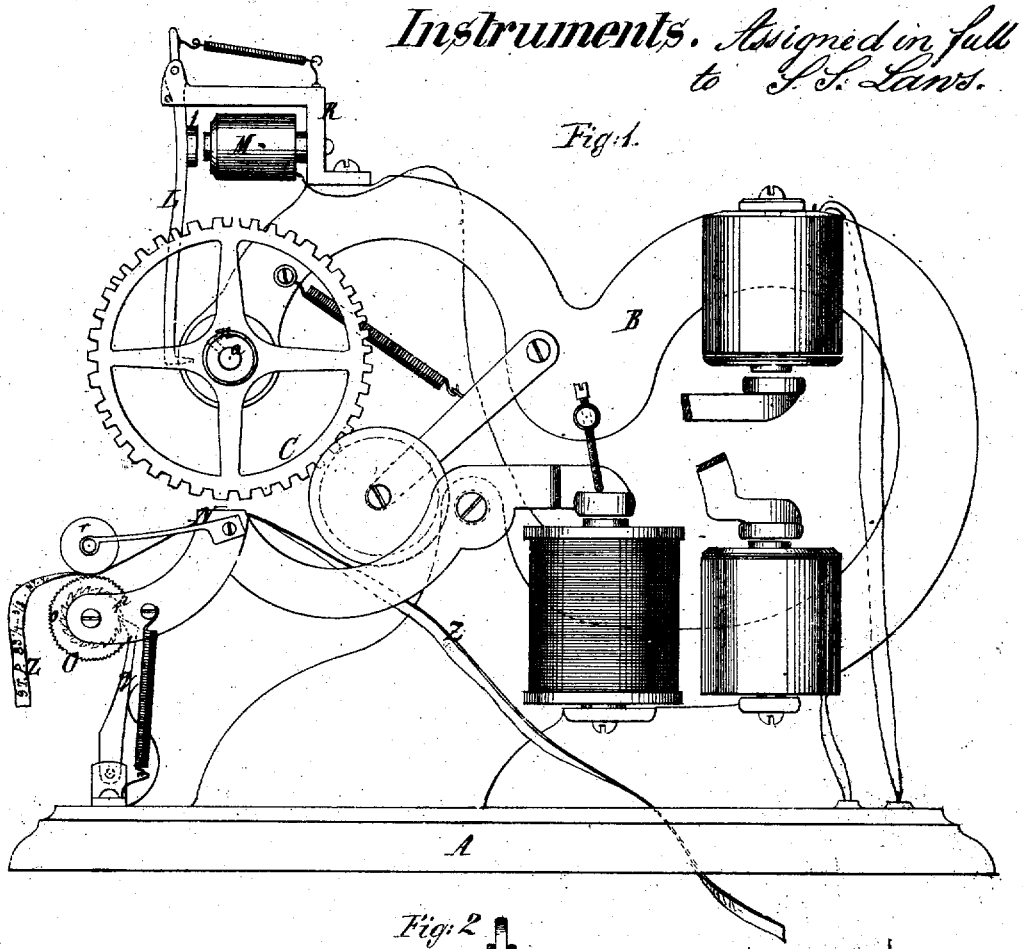
Figure 2:
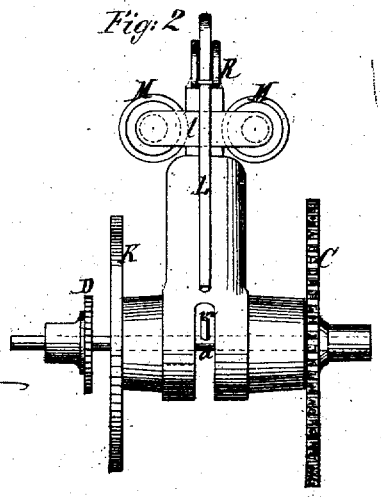
Figure 3:
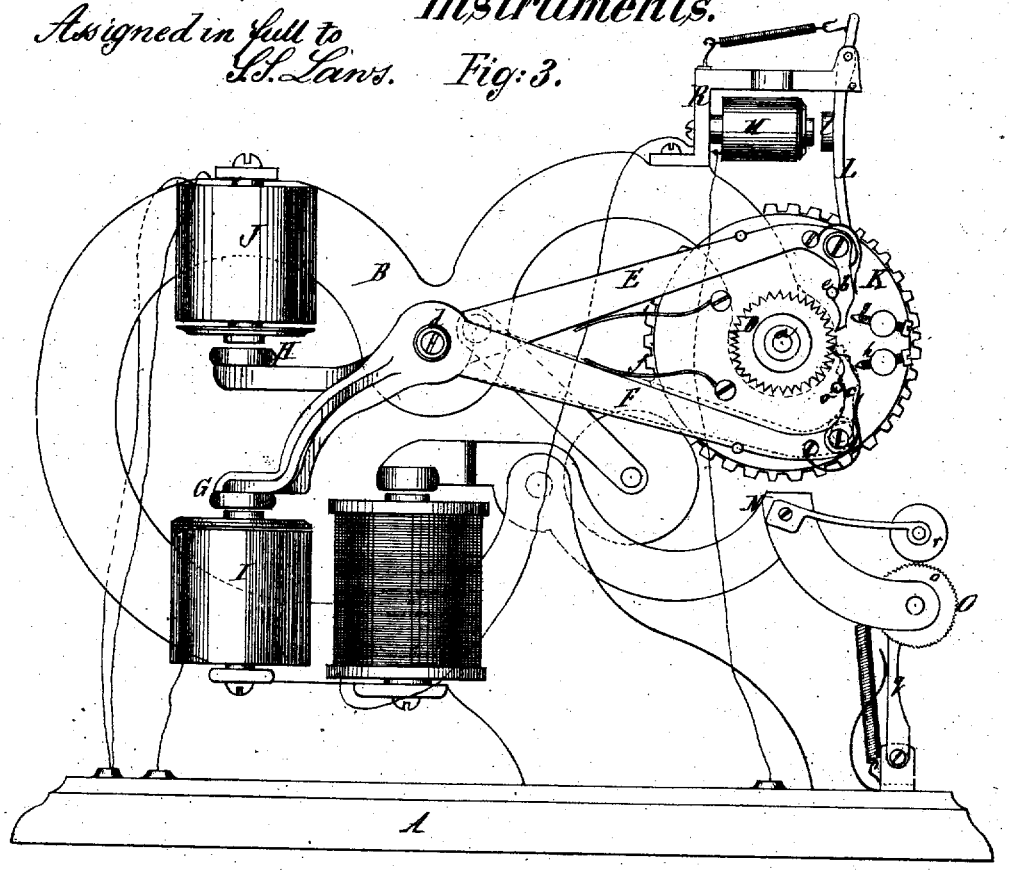
Figure 4:
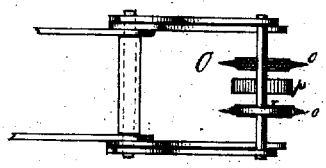
Figure 5:
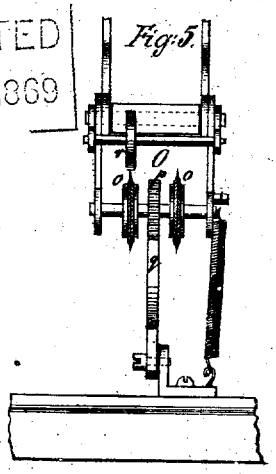

Figure 1 represents a side elevation of this instrument, showing the printing mechanism. Fig. 2 is a front view of the unison mechanism detached. Fig. 3 is a side elevation of the instrument, showing the mechanism for imparting to the type-wheel a step-by-step movement in either direction. Fig. 4 is a plan of the paper-feed mechanism detached. Fig. 5 is a front view of the same.

This invention relates to certain improvements in that class of instruments for which Letters Patent were granted to S. S. Laws, December 31, 1867, and March 24, 1868, and also described in an application for a patent filed by said S. S. Laws in the Patent Office, January 4, 1869.

Before this invention a type-wheel had been moved in either direction with a step-by-step motion, and a pawl or click had been used in other machinery to run beneath a stop and block the further movement of the ratchet-wheel.

In printing-telegraphs it is necessary to stop the character-wheel with great accuracy so that the impression may be properly made. To effect this object the stop that acts to block the pawl or click and type-wheel is adjustable, so as to compensate wear or inaccuracy of workmanship, and by making clicks to act in opposite directions by levers and electro-magnets the type-wheel can be moved progressively in either direction and stopped accurately, the clicks and stops limiting the movement of the lever, armature, ratchet-wheel, and character wheel.

The invention consists in the arrangement of a separate magnet, in combination with the unison-lever, in such a manner that the operator has absolute control over the unison-stops of all the instruments in the line without danger of disturbing the power of any of the other magnets.

In the drawings, A designates a small bed-plate, from which rises an arm, B, which may be cast solid with or otherwise rigidly attached to said bed-plate. At the outer end of this arm B is a bearing for the shaft *a*, on one end of which is mounted the type-wheel C, while near its other end is the ratchet-wheel D, said shaft being fitted in its bearings so that it turns freely; but sufficient friction is provided to steady the type-wheel in any position into which it may be brought. This friction may be obtained and regulated by the pressure of an adjustable spring upon the ratchet-shaft or otherwise.

The ratchet-wheel D is star-shaped or double acting, and it is acted upon by two pawls or clicks, *b c*, which are pivoted to levers E F, extending from the armatures G H of two electro-magnets, I J. Said levers may have a common fulcrum on the pivot or stud *d*, and their armatures and electro-magnets are arranged in such relation to said levers and to the ratchet-wheel D that the levers E F are caused to oscillate in opposite directions when their respective magnets are charged, and by the action of one of the clicks the ratchet-wheel assumes a step-by-step movement in one direction, while the other click produces a step-by-step movement of the ratchet-wheel in the opposite direction.

The position of the clicks in relation to the teeth of the ratchet-wheel is governed by two sets of stops, *e f*, *g h*, which are secured in a disk, K, at the end of the arm B or other rigid support. The stops *e* and *f* act on projections on the inner edges of the clicks *b c*, respectively, and when the levers E and F are forced back by the action of their springs *i* and *j* said pins lift and hold the points of the clicks out of the path of the ratchet-teeth, and, if either of the armatures is attracted and its lever caused to move, the pawl, being released of the pin *e* or *f*, is thrown in gear with the ratchet-teeth by the action of its spring, and the stop-pin *g* or *h* acts against the outside edge of the click and holds it in gear and locks it with the ratchet-wheel, causing the same to stop at the distance of one tooth, and this is effected with accuracy by adjusting the stop *g* or *h*. The stop *g* or *h* might be combined into one pin, serving the same purpose for each of the pawls. By this arrangement a step-by-step movement can be imparted to the ratchet-wheel, and it is governed by the action of the stops *e f g h* on the clicks, the friction applied to the type-wheel or arbor being sufficient to prevent the ratchet from moving when the lever-pawls are drawn back from the teeth.

It is obvious that the effect of the two clicks will be the same if they are made to engage with two ratchet-wheels on the same arbor with the teeth facing in opposite directions, such ratchets being a mechanical equivalent of the star-shaped ratchet shown in the drawings, and each ratchet-wheel, click, and adjustable stop acting in the manner aforesaid.

The pairs of electro-magnets I J may be fastened to the arm B, so that said arm comes between them, and easy access can be had to them and to their connections.

In order to throw all the instruments on a line in unison, a "unison-lever," L, is used, substantially such as described in the application of S. S. Laws for a patent on printing-telegraph, filed in the Patent Office January 4, 1869. This unison-lever is hinged to a bracket, R, which is firmly secured to the main arm B, and to said lever is attached the armature *l* of a separate electro-magnet, M. The lower end of the unison-lever L forms a hook, (see Fig. 1,) and if the circuit through the electro-magnet M is closed this hook is thrown in the path of a pin, *m*, which projects from the shaft *a*, (see Figs. 1 and 2,) so that the motion of said shaft is stopped as soon as the pin *m* comes in contact with the unison-lever. The pins *m* on the several instruments in a line are made to correspond in position to a certain type or character on the several type-wheels, and consequently by working all the instruments round in either direction until the several pins *m* are brought in contact with the several unison-levers all the type-wheels are arrested in the same position and all the instruments are thrown into unison.

The object of working the unison-lever by a separate magnet is to enable the operator to control the position of said unison-lever without disturbing any other part of the mechanism, and particularly without diminishing the power of the main magnets, as when the unison-lever is operated by secondary armatures from either or both of the main magnets.

The strip of paper Z is carried through between the platen N and the type-wheel by the feed mechanism O.

A roller, *r*, presses the strip of paper against one of the serrated rims or flanges *o* of the feed-wheel, and as the platen-lever oscillates by the combined action of its electro-magnet and its detaching-spring the ratchet of the feed-drum acts against the click *q* and receives an intermittent rotary motion, so that for each oscillation of the platen-lever the strip of paper is removed a sufficient distance to make room for a subsequent impression.

The pressing-roller *r* is situated on the inside of the feed-drum, and consequently the letters and characters printed on the strip of paper are not at all concealed by it, and said characters remain open to view from the time when they are printed.

What is claimed as the invention of THOMAS A. EDISON is—

1. The adjustable stop *g* or *h*, in combination with the click *b* or *c* and ratchet-wheel D, substantially as specified, whereby the position of the wheel D when blocked and stopped can be adjusted by the stop *g* or *h*, substantially as set forth.

2. The adjustable stop *g* or *h*, click *b* or *c*, ratchet-wheel D, and lever E or F, in combination with the type or character wheel C and an electro-magnet to give motion to the lever, substantially as and for the purposes set forth.

3. The clicks *b c*, levers E F, magnets I J, and ratchet-wheel D, in combination with the stops *e g f h*, substantially as specified, for moving a type or character wheel with a step-by-step motion in either direction, substantially as specified.

4. The unison-lever L, in combination with the type or character wheel and a separate electro-magnet, M, substantially as specified.

Dated December 28, A. D. 1869.

THE GOLD & STOCK TEL. CO.,
GEO. B. FIELD, *President*,
H. L. HOTCHKISS, *Secy.*

Witnesses:
CHAS. H. SMITH,
GEO. D. WALKER.